UNITED STATES PATENT OFFICE.

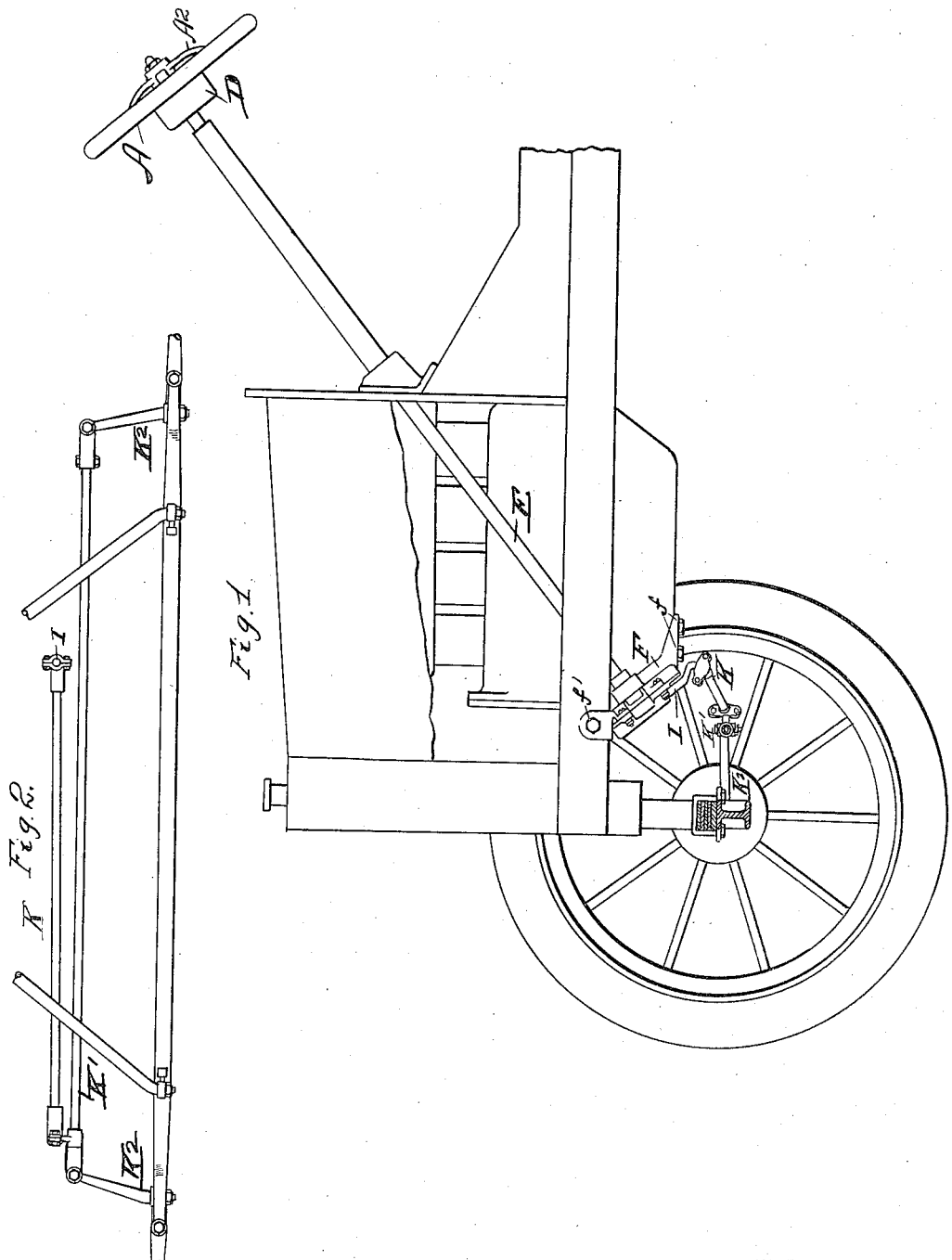

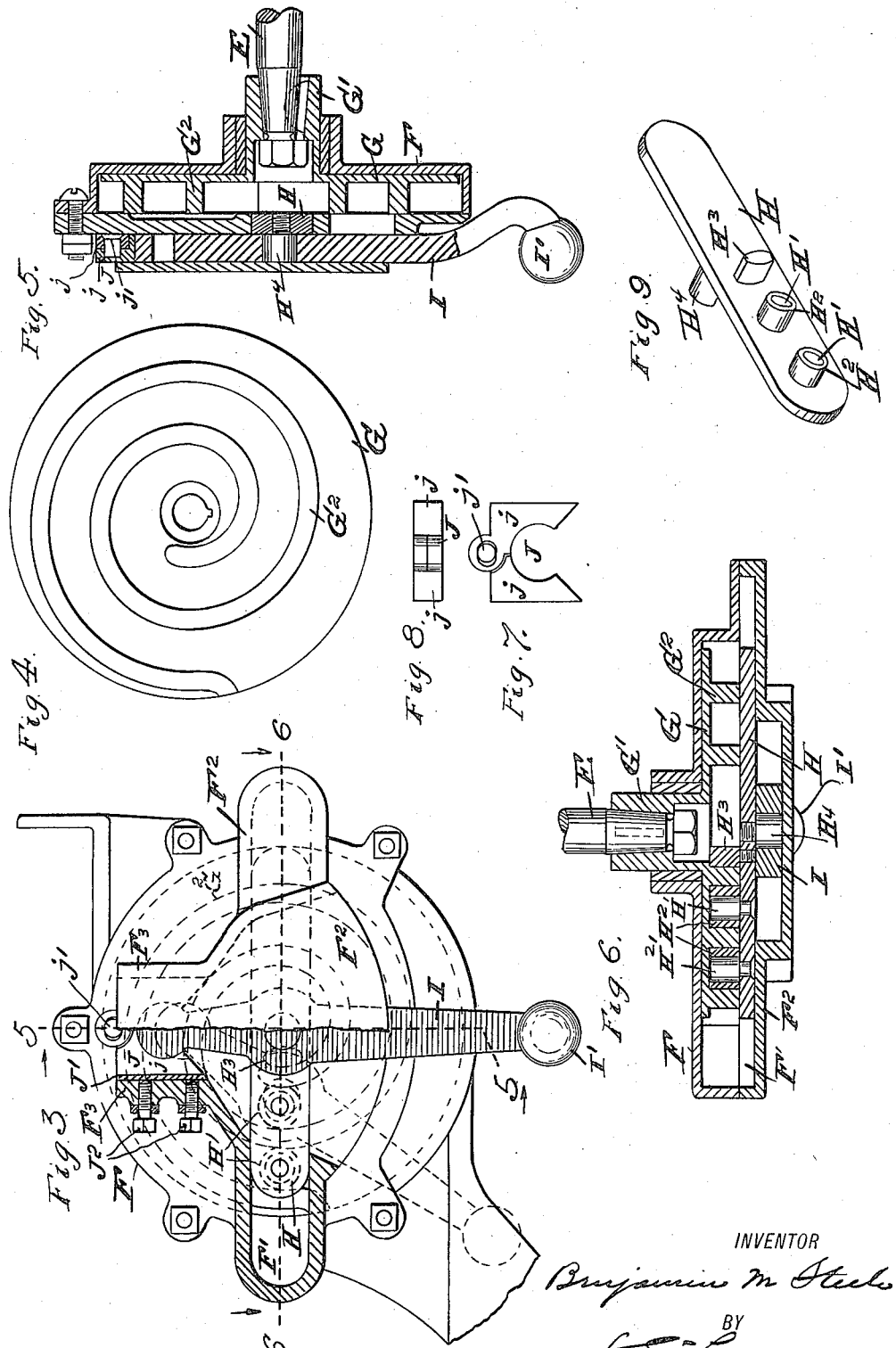

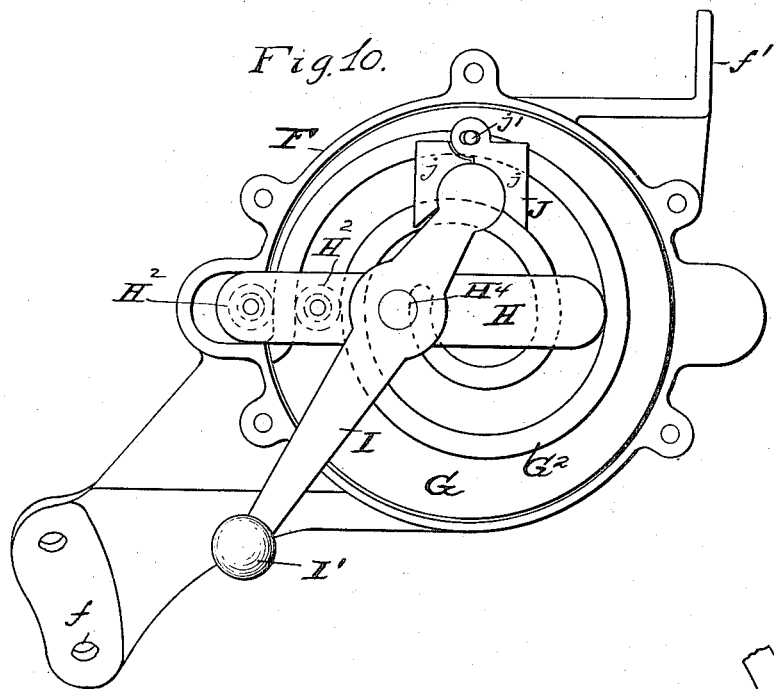
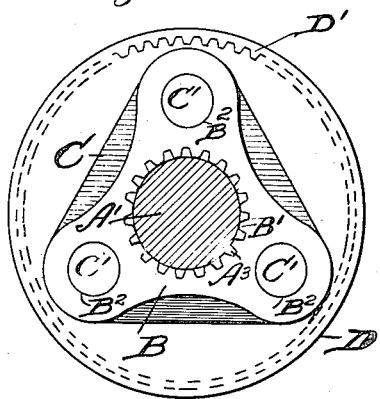
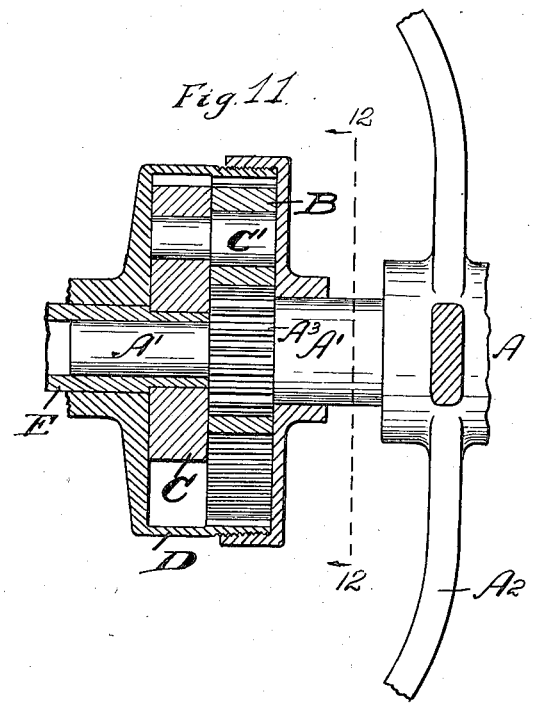

BENJAMIN M. STEELE, OF DETROIT, MICHIGAN.

STEERING-GEAR FOR VEHICLES.

1,243,889.  Specification of Letters Patent.  Patented Oct. 23, 1917.

Application filed January 29, 1917. Serial No. 145,052.

*To all whom it may concern:*

Be it known that I, BENJAMIN M. STEELE, citizen of the United States, residing at Detroit, county of Wayne, State of Michigan, have invented a certain new and useful Improvement in Steering-Gears for Vehicles, and declare the following to be a full, clear, and exact description of the same, such as will enable others skilled in the art to which it pertains to make and use the same, reference being had to the accompanying drawings, which form a part of this specification.

My invention relates to steering gears for automobiles shown in the accompanying drawings and more particularly set forth in the following specification and claims.

It has been conceded by automobile engineers and the users of cars generally that an irreversible and powerful steering-gear is necessary for the safety and pleasure of the driver in controlling and guiding an automobile,—it being well known that on long drives it is not the simple turning of the wheel to keep the car in the right direction that becomes tiresome, but the constant tension necessary for instant action for the adjustment of the wheel following each road shock and the "bracing" of the driver for the next shock.

Owing to the construction and weight of an automobile, and the speed at which it is driven, it is quite essential that the movement of the car should be as nearly as possible in a straight forward direction; the kinetic energy of the car becoming so great that any change in direction becomes a means of great wear upon the car and loss in consumption of power. It will be readily seen that to move so great a mass to one side requires an enormous force which must tend to wear out the parts affected, and as any deflection from a straight forward direction requires additional power to keep up the speed it is indisputable that the steering mechanism should as nearly as possible maintain this condition with ease of operation to the driver.

One of the objects therefore of this invention is to provide a steering gear which is fully irreversible, so that any force on the front wheels of the vehicle will not affect the steering wheel.

Another object of the invention is to provide a device inexpensive in construction and simple in its operation and which is particularly adapted for installation upon the so called "Ford" car without alteration or material change in the latter or its several parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of said invention.

While this device is adapted for use on other types of automobiles, the embodiment herein disclosed has been especially designed with the view of its installation upon a "Ford" car.

Referring now to the accompanying drawings forming part of this specification,

Figure 1 is a fragmentary side elevation of an automobile with parts broken away and in section, showing the steering wheel column and steering rod connections.

Fig. 2 is a fragmentary plan view of the front axle, showing the steering ball and steering spindle connecting rods.

Fig. 3 is an elevation of the case inclosing a spiral-cam keyed to the lower end of the steering wheel post, with parts broken away and in section.

Fig. 4 is an elevation of the spiral-cam removed from the case.

Fig. 5 is a cross sectional view on line 5—5 of Fig. 3, looking in the direction of the arrows.

Fig. 6 is a cross-sectional view on line 6—6 of Fig. 3 looking in the direction of the arrows.

Fig. 7 is an elevation of the movable pivotal block.

Fig. 8 is an end elevation of the same.

Fig. 9 is a perspective view of the slidable spiral-cam bar.

Fig. 10 is an elevation of the case inclosing the spiral-cam, with the cover removed, showing the spiral-cam, its coöperating sliding bar, and the swinging lever actuated thereby as they would appear when at the limit of their movement in one direction.

Fig. 11 is a longitudinal sectional view through a "Ford" steering gear case, with the pinions removed and a triangular plate substituted therefor provided with a central internal gear in mesh with the steering wheel gear drive pinion;—the view also includes a fragment of the steering column and the spider of the steering wheel.

Fig. 12 is a cross sectional view through the stub-shaft of the steering wheel on line 12—12 of Fig. 11, looking toward the steering gear case, the cover of which is removed to disclose the triangular plate substituted for the pinions surrounding the central steering gear drive pinion.

Referring now to the letters of reference placed upon the drawings,

A, denotes the steering wheel of a Ford car.

A', a stub shaft on which the steering wheel is supported by the spider $A^2$. $A^3$, denotes the steering gear drive pinion, integral with the stub shaft.

B, denotes a triangular plate having a central internal gear B', in mesh with the steering gear drive pinion $A^3$. $B^2$, indicate apertures in the arms of the triangular plate to receive the respective studs C', of the triangular plate C, which in the regular Ford construction carries pinions (not shown) in mesh with the pinion $A^3$. D, denotes the usual steering gear case of this type of car, mounted upon the tube inclosing the steering post;—its internal gear D', however performs no function in the present embodiment.

E, designates the steering post keyed to the triangular plate C. F, indicates a spiral-cam case bolted at $f$, to the engine, and at $f'$, to the chassis frame. G, denotes a disk, having an internal tapering hub G', keyed and bolted to the lower end of the steering post E. $G^2$, indicates a spiral-cam integral with the disk. H, designates a sliding bar, adapted to overlie the walls of the spiral-cam, the bar being lodged in an elongated channel F', formed by the walls of the cover-plate $F^2$, inclosing the spiral-cam case. Projecting from the sliding bar H, are studs H', spaced apart, on which are mounted rolls $H^2$, adapted to traverse the groove between the walls of the spiral cam. $H^3$, denotes a projecting lug, spaced from the rolls $H^2$, which is also adapted to be acted upon by the spiral cam. A roll may be employed in place of the lug $H^3$, but the latter form is better adapted for use in connection with the Ford type of construction. Projecting centrally from the opposite side of the sliding bar H, is a stud $H^4$, on which is mounted a swinging arm I, on the lower end of which is formed a steering ball or knuckle I'. The opposite end of the swinging steering gear ball arm I, is of semi-circular form and is lodged in a divided sliding block J, guided between the walls $F^3$, of the cover plate $F^2$. The block J, is formed of two members $j$, $j$, connected together by a transverse pin $j'$, projecting through elongated slots formed in the members $j$, which are adapted to embrace the semi-circular end of the swinging arm. J', is a shim located between the block J, and the wall $F^3$, of the cover plate, and $J^2$, are set screws projecting through the wall and bearing upon the shim, which when adjusted serve to take up wear between the several parts. K, indicates the usual Ford steering gear connecting rod, which at one end articulates with the swinging steering gear ball-arm I, and at the other end with the spindle connecting rod K', leading to the right and left spindle assembly $K^2$.

Having indicated the several parts by reference letters the construction and operation of the device will be readily understood.

A rotation of the steering wheel A, to the right or left will serve to rotate the triangular plate B, locked to the stub shaft A', through the interlocking teeth of the plate and the drive pinion $A^3$. The plate B, being engaged with the studs C', of the triangular plate C, and the latter being keyed to the steering post E,—upon the operation of the steering wheel, the steering post may be rotated to the right or left as desired.

To the lower end of the steering post the spiral cam G, is secured, and upon the latter being rotated to either the right or left, the sliding bar H, is shifted in the elongated way formed in the cover of the cam case, through the rolls $H^2$, and lug $H^3$, which are acted upon by the spiral cam. The movement of the sliding bar H, to the right or left actuates the swinging steering gear ball-arm I, pivoted to the sliding bar, while the sliding block J, with which the upper end of the arm I, articulates will automatically adjust itself to the "throw" of said arm.

The steering gear connecting rod K, which articulates with the ball-arm I, is thus actuated, and being connected with the spindle connecting rod K', which is in turn connected with the right and left spindle assembly, serves to turn the forward traction wheels to the right or left as required.

It will be clear that through the action of the spiral-cam a slight rotation of the steering wheel will serve to turn the forward traction wheels to a relatively greater extent, and that when adjusted any road shock caused by ruts or resulting from the rough and rugged character of the road will not affect the steering wheel to shift the latter when so adjusted.

The movement of the steering wheel itself in either direction is limited by the position of the sliding bar and the rolls carried thereby acting in conjunction with the spiral-cam;—the position of the swinging ball-arm shown in dotted lines being the limit of its movement in one direction, while its opposite "throw" is also limited by the action of the cam, as will be readily understood.

Having thus described my invention what I claim is:—

1. In a steering mechanism for vehicles, a steering wheel shaft, a spiral cam carried on the end of the steering wheel shaft, a slidable bar adapted to be reciprocated by said cam, a swinging arm pivoted between its ends to the slidable bar, means for yieldingly holding one end of the swinging arm, and means articulating with the other end of the swinging arm, adapted to shift the traction wheels of a vehicle.

2. In a steering mechanism for vehicles, a steering wheel shaft, a disk having a spiral rib cam encircling the axis of the steering wheel shaft, a slidable bar adapted to be reciprocated by said cam, a swinging arm pivoted between its ends to the slidable bar, a movable block with which one end of the swinging arm is connected, and means articulating with the other end of the swinging arm, adapted to shift the traction wheels of a vehicle.

3. In a device of the character described, a steering wheel shaft, a member having a spiral rib encircling the axis of said shaft and carried by the latter, an inclosing case for said member, a slidable bar adapted to be reciprocated by the cam and guided in ways formed by the walls of said case, a swinging arm pivoted to the slidable bar, a movable block articulating with one end of the swinging arm and slidable in guides formed by the walls of the inclosing case, and means articulating with the other end of the swinging arm adapted to shift the traction wheels of a vehicle.

4. In a steering mechanism for vehicles, a steering wheel shaft, a disk attached to the shaft having a spiral rib encircling the axis of the shaft, a case inclosing said disk adapted to be secured to the frame of a vehicle, a slidable bar carrying projections to be acted upon by the spiral rib of the disk for reciprocating the bar, a swinging arm pivoted to the bar, a divided movable block slidable in ways formed by the walls of the spiral disk case and articulating with one end of the swinging arm, and means articulating with the other end of the arm adapted to coöperate to shift the traction wheels of a vehicle.

5. In a steering mechanism for vehicles, a steering wheel shaft, a member having a spiral rib encircling the axis of the shaft, an inclosing case for said member, a slidable bar adapted to be actuated by the spiral rib of said member, a swinging arm pivoted to the slidable bar, a divided block slidable in ways formed by the walls of the inclosing case and articulating with one end of the swinging arm, means located between said block and its ways to take up the wear between the parts, and means articulating with the other end of said swinging arm adapted to coöperate for shifting the direction to be taken by the traction wheels of a vehicle.

In testimony whereof, I sign this specification in the presence of two witnesses.

BENJAMIN M. STEELE.

Witnesses:
S. E. THOMAS,
N. HURLEY.